(12) United States Patent
Goto (10) Patent No.: US 8,396,443 B2
(45) Date of Patent: Mar. 12, 2013

(54) POWER SUPPLY CIRCUIT AND RECEIVING APPARATUS

(75) Inventor: Yuichi Goto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 341 days.

(21) Appl. No.: 12/728,843

(22) Filed: Mar. 22, 2010

(65) Prior Publication Data

US 2011/0012576 A1    Jan. 20, 2011

(30) Foreign Application Priority Data

Jul. 17, 2009  (JP) .................................. 2009-168932

(51) Int. Cl.
*H04B 1/16* (2006.01)
*G05F 1/00* (2006.01)

(52) U.S. Cl. ..................................... 455/343.1; 323/282

(58) Field of Classification Search ............... 455/343.1, 455/334, 280, 289; 323/282
See application file for complete search history.

(56) References Cited

U.S. PATENT DOCUMENTS

| 6,903,656 B1* | 6/2005 | Lee ............................. 340/572.1 |
| 2009/0174385 A1* | 7/2009 | Yen et al. ...................... 323/288 |

FOREIGN PATENT DOCUMENTS

| JP | 2007151322 | 6/2007 |
| JP | 2008-253001 | 10/2008 |

OTHER PUBLICATIONS

Japanese Office Action for Japanese Patent Application Serial No. 2009-168932 mailed on May 24, 2011.
Chinese Office Action for Chinese Patent Application No. 201010129967.1 mailed on Sep. 20, 2012.

* cited by examiner

*Primary Examiner* — Nguyen Vo
(74) *Attorney, Agent, or Firm* — Turocy & Watson, LLP (57) ABSTRACT

A power supply circuit includes: a DC-to-DC converter outputting a first voltage dropped from an input supply voltage; and a series regulator outputting a second voltage dropped from an output of the DC-to-DC converter, the series regulator including: an output transistor supplied with the output of the DC-to-DC converter and outputting the second voltage, and a first control circuit operated by the input supply voltage and controlling the output transistor.

6 Claims, 5 Drawing Sheets

POWER SUPPLY CIRCUIT AND RECEIVING APPARATUS

CROSS-REFERENCE TO RELATED APPLICATIONS

This application is based upon and claims the benefit of priority from the prior Japanese Patent Application No. 2009-168932, filed on Jul. 17, 2009; the entire contents of which are incorporated herein by reference.

BACKGROUND

1. Field

Embodiments of the invention relate generally to a power supply circuit and a receiving apparatus.

2. Background Art

Switching DC-to-DC converters are used as small and high efficient power supplies because high efficient power supplies are required to reduce power dissipation of electric apparatuses. However, outputs of the DC-to-DC converters are superposed with ripple voltages due to switching, and have high level of noises.

On the other hand, Series regulators are used as low noise power supplies because small and low noise power supplies are required to extend functionality and performances. Series regulators are used also as power supply circuits in DC-to-DC converters (for example, refer to JP-A 2007-151322(Kokai)).

Furthermore, as a high efficient and low noise power supply, a power supply circuit configuring a cascade connection between a series regulator and an output of a DC-to-DC converter is also used.

Downscaling, increasing efficiency, and reducing noise are achieved by having a cascade connection between a series regulator and an output of a DC-to-DC converter. However, the aforementioned power supply has a problem of increasing power dissipation because a certain voltage difference between an input and output of the series regulator is required to operate the series regulator.

SUMMARY

According to an aspect of the invention, there is provided a power supply circuit including: a DC-to-DC converter outputting a first voltage dropped from an input supply voltage; and a series regulator outputting a second voltage dropped from an output of the DC-to-DC converter, the series regulator including: an output transistor supplied with the output of the DC-to-DC converter and outputting the second voltage, and a first control circuit operated by the input supply voltage and controlling the output transistor.

According to another aspect of the invention, there is provided a receiving apparatus including: an antenna terminal; a power supply circuit outputting a second voltage to the antenna terminal; and a receiving circuit receiving a radio signal from the antenna terminal, the power supply circuit includes: a DC-to-DC converter outputting a first voltage dropped from an input supply voltage; and a series regulator outputting the second voltage dropped from an output of the DC-to-DC converter, the series regulator including: an output transistor supplied with the output of the DC-to-DC converter and outputting the second voltage, and a first control circuit operating with the input supply voltage and controlling the output transistor.

DETAILED DESCRIPTION

Embodiments of the invention will now be described in detail with reference to the drawings.

In the specification and the drawings, the same elements as those described previously with reference to earlier figures are labeled with like reference numerals, and the detailed description thereof is omitted as appropriate.

In the specification, each of high and low of a voltage is used as an absolute value of a voltage, and step-down is used to refer to lowering an absolute value of a voltage. Furthermore, the logic level of a signal is denoted by positive logic, true, i.e., high level is denoted by "1", and false, i.e., low level is denoted by "0".

Figure 1:
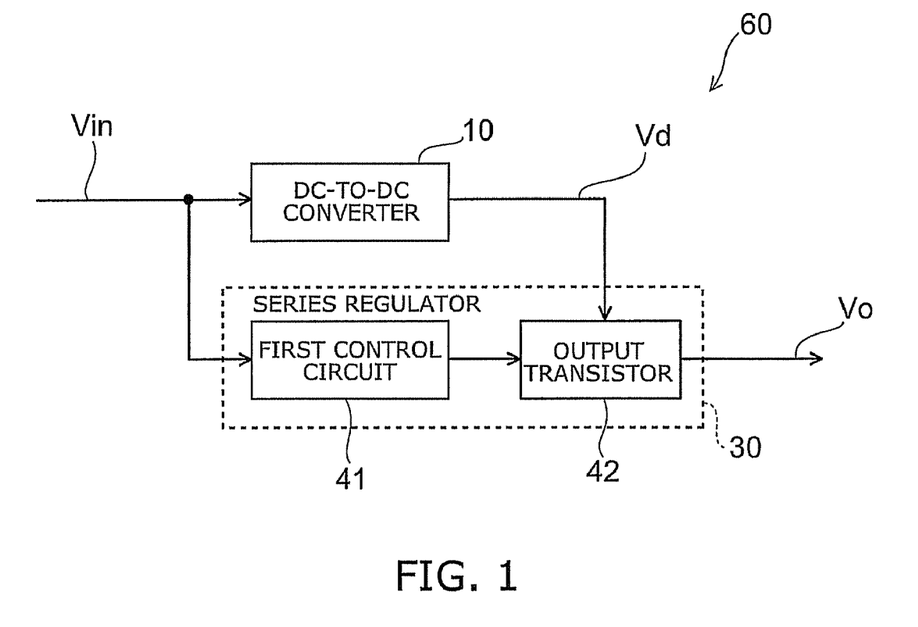
FIG. 1 is a block diagram illustrating the configuration of a power supply circuit according to an embodiment of the invention.

FIG. 1 is a block diagram illustrating the configuration of a power supply circuit according to an embodiment of the invention.

As shown in FIG. 1, a power supply circuit 60 of this embodiment includes a DC-to-DC converter 10 and a series regulator 30. These are formed in the same semiconductor substrate to provide a one-chip structure or formed in a plurality of chips and packaged in one package.

The DC-to-DC converter 10 is a switching type buck (step-down) DC-to-DC converter, which outputs a first voltage dropped from an input supply voltage of an input supply line Vin.

The series regulator 30 includes an output transistor 42 and a first control circuit 41.

The output transistor 42 has one end connected to an output line Vd and supplying with a first voltage and the other end outputting a second voltage. The first control circuit 41 controls the output transistor 42. Here, since the first control circuit 41 is operated by the input supply voltage of the input supply line Vin, the first control circuit 41 can control the output transistor 42 with a higher voltage than in the case where the first control circuit 41 is operated by the first voltage.

Thus, in the power supply circuit 60 of this embodiment, the input supply voltage of the input supply line Vin is dropped to the first voltage by the DC-to-DC converter 10, and the first voltage is dropped to the second voltage by the series regulator 30.

There are switching ripples on the first voltage of the output line Vd of the DC-to-DC converter 10, and it causes to generate noise when the first voltage is directly used as a supply voltage of an electric circuit. This noise causes a problem on receiving apparatuses, for instance, satellite broadcasting tuners to receive weak signals. The series regulator 30 receives the first voltage from the output line Vd of the DC-to-DC converter 10, attenuates ripples, and reduces noise.

It is required to take a voltage drop of the output transistor 42, i.e., a difference between the first voltage and the second voltage high enough to secure the amount of ripple attenuation. However, as the voltage drop of the output transistor 42 increases, efficiency decreases, and generation of heat also increases.

Hence, it is more desirable that the first voltage of the output line Vd of the DC-to-DC converter 10 is set as close as to the second voltage of the output line Vo of the series regulator 30 although it is required that the first voltage of the output line Vd of the DC-to-DC converter is higher than the second voltage of the output line Vo of the series regulator 30.

In the power supply circuit 60, the first control circuit 41 of the series regulator 30 is configured to run by the input supply voltage of the input supply line Vin.

Thus, bias voltages and currents of the output transistor 42 are not affected by ripples of the output line Vd of the DC-to-DC converter 10, and the first control circuit 41 can control the output transistor 42 with higher voltage than in the case where the first control circuit 41 is operated by the first voltage. A difference between the first voltage and the second voltage can be set to the lowest input and output voltage difference with which the output transistor 42 shows constant current characteristic.

Thus, the voltage drop of the output transistor 42 is restrained, power loss of the series regulator 30 is reduced, and the amount of ripple attenuation is secured. The power supply circuit 60 of this embodiment provides a power supply circuit having low power dissipation and low noise.

This embodiment of the invention will now be described in detail with reference to circuit diagrams.

Figure 2:
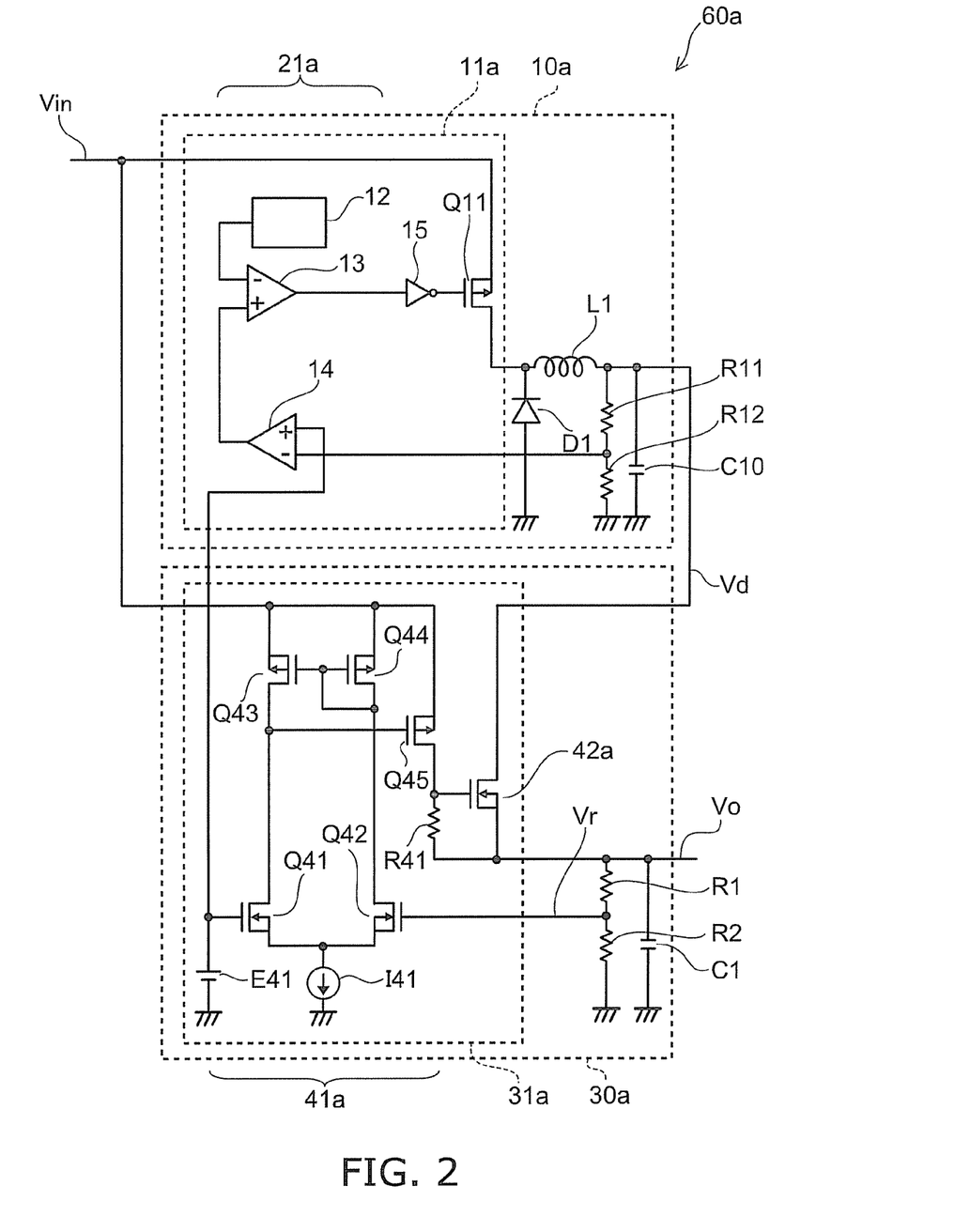
FIG. 2 is a circuit diagram illustrating the configuration of a power supply circuit according to an embodiment of the invention.

FIG. 2 is a circuit diagram illustrating the configuration of a power supply circuit according to an embodiment of the invention.

As shown in FIG. 2, a power supply circuit 60a includes a DC-to-DC converter 10a and a series regulator 30a.

In the power supply circuit 60a, a chopper type step-down DC-to-DC converter is used as the DC-to-DC converter 10a. As the series regulator 30a, the configuration in which an output transistor 42a is controlled by a first control circuit 41a is illustrated.

Next, the DC-to-DC converter 10a and the series regulator 30a will be described individually.

The DC-to-DC converter 10a includes a first switching element Q11, a diode D1, a coil L1, dividing resistors R11 and R12, a capacitor C10, and a second control circuit 21a.

The first switching element Q11 has one end connected to an input supply line Vin and the other end connected to an output line Vd of the DC-to-DC converter 10a via the coil L1. The one end of the first switching element Q11 is supplied with the input supply voltage, and the other end of it outputs the first voltage via the coil L1. The diode D1 is connected between the other end of the first switching element Q11 and the ground. The dividing resistors R11 and R12 are mutually connected in series and connected between the output line Vd of the DC-to-DC converter 10a and the ground. Further, the capacitor C10 is connected between the output line Vd of the DC-to-DC converter 10a and the ground.

The second control circuit 21a includes a triangle wave generator circuit 12, a comparator 13, an error amplifier 14, and a NOT circuit 15. In the power control circuit 60a, the configuration in which the series regulator 30a has a reference voltage generating circuit E41 is illustrated. A fourth voltage, an output voltage of the reference voltage generating circuit E41, is supplies to the error amplifier 14 as a third voltage. Here, the third voltage is a reference voltage of the second control circuit 21a of the DC-to-DC converter 10a. As recited above, the fourth voltage is an output voltage of the reference voltage generating circuit E41.

The error amplifier 14 amplifies a difference between the third voltage and a divided voltage of the first voltage divided by the dividing resistors R11 and R12, i.e., amplifying an error and outputting an error voltage.

The comparator 13 compares an output of the triangle wave generator circuit 12 to an output (the error voltage) of the error amplifier 14. The comparator 13 outputs "0" when the output of the triangle wave generator circuit 12 is larger than the error voltage and outputs "1" when the output of the triangle wave generator circuit 12 is smaller than the error voltage.

The triangle wave generator circuit 12 generates a triangle wave and converts the amount of the error voltage to a time period.

A triangle wave is a signal of which a voltage increases in a first half of a cycle and decreases in a second half of the cycle. Comparing the triangle wave to the error voltage with the comparator 13, the output of the comparator 13 turns over when a voltage of the triangle wave becomes higher than the error voltage.

Thus, the output of the comparator 13 is a PWM signal of which a duty ratio varies according to the amount of the error voltage. The first voltage outputting from the DC-to-DC converter 10 is lower, the error voltage is higher, and the duty ratio is larger (a time period of "1" becomes longer).

The output of the comparator 13 is inputted into the NOT circuit 15, and the NOT circuit 15 drives the first switching element Q11.

As the first voltage is lower, an on time period of the first switching element Q11 becomes longer, the coil L1 is stored up more energy, and the first voltage increases. As the first voltage is higher, an off time period of the first switching element Q11 becomes longer, the coil L1 supplies a regeneration current through the diode D1, and the first voltage becomes lower.

Thus, in the chopper type DC-to-DC converter 10a, the on time period of the first switching element Q11 switching a current of the coil L1 is controlled by the second control circuit 21a so that the output voltage of the DC-to-DC converter, i.e., the first voltage is sustained.

The output of the DC-to-DC converter 10a, i.e., the first voltage is filtered by the capacitor C10 and is supplied to a drain of the output transistor 42a of the series regulator 30a. In the DC-to-DC converter 10a, the configuration of voltage control used with the triangle wave generator circuit 12 is illustrated. However, the invention is not limited thereto. A switching DC-to-DC converter, for instance, current-mode control may be used.

In the DC-to-DC converter 10a, the first switching element Q11 is a p-channel MOSFET; therefore, the NOT circuit 15 is inserted because of the coordination of a logic level. However, the input of the comparator 13 may be inverted so that the NOT circuit 15 is omitted. Alternatively, an n-channel MOSFET may be used as the first switching element Q11.

Furthermore, a second switching element may be included in parallel with the diode D1 so that synchronized rectifying DC-to-DC converter may be formed. In this case, a parasitic diode of the second switching element may be used as the diode D1. Here, the second switching element is controlled by the output of the comparator 13. That is, the second control circuit 21a controls at least the first switching element Q11, and may further control the second switching element.

The series regulator 30a includes a first control circuit 41a, an output transistor 42a, dividing resistors R1 and R2, and a capacitor C1.

The first control circuit 41a includes transistors Q41-Q45, a resistor R41, a current generating circuit I41, and a reference voltage generating circuit E41.

Here, the transistors Q41-Q45, the resistor R41, and the current generating circuit I41 form an error amplifier. The error amplifier outputs a difference between a third voltage outputted from the reference voltage generating circuit E41 and a divided voltage of the second voltage divided by the dividing resistors R1 and R2, i.e., amplifying an error and outputting as an error voltage. The output transistor 42a is controlled by the error voltage so that the output voltage, i.e., the second voltage is sustained.

In the power supply circuit 60a, a unit 11a of the DC-to-DC converter 10a and a unit 31a of the series regulator 30a may be formed in the same semiconductor substrate to provide a one-chip structure or formed in a plurality of chips and packaged in one package.

Here, the unit 11a is a circuit omitted the diode D1, the coil L1, the dividing resistors R11 and R12, and the capacitor C10 from the DC-to-DC converter 10a. The unit 31a is a circuit omitted the dividing resistors R1 and R2, and the capacitor C1 from the series regulator 30a.

In the series regulator 30a, the configuration of the error amplifier is illustratively used by a two-stage configuration with a differential amplifier of the transistors Q41 and Q42, and the transistor Q45. However, the invention is not limited thereto. The output transistor 42a may be controlled by amplifying a difference between the third voltage and the second voltage or the divided voltage of the second voltage.

In the series regulator 30a, the output transistor 42a is illustratively an n-channel MOSFET, but a p-channel MOSFET may be used. The output transistor 42a, the transistors Q41-Q45 may also be bipolar transistors.

It is needed that the output voltage of the DC-to-DC converter 10a, i.e., the first voltage is higher than output voltage of the series regulator 30a, i.e., the second voltage. However, the first voltage is set as near as possible to the second voltage so that power loss generating the output transistor 42a becomes lower, efficiency becomes higher, and generation of heat can be reduced.

However, the performance of ripple attenuation of the series regulator 30a is deteriorated when the first voltage is so close to the second voltage. The first control circuit 41a of the series regulator 30a is operated by the input voltage of the DC-to-DC converter 10a, i.e., the input supply voltage. Thus, biases of the output transistor 42a is not affected by ripples of the DC-to-DC converter 10a, and the first control circuit 41a can control the output transistor 42a with a higher voltage than in the case where the first control circuit 41 is operated by the first voltage. It is also possible to operate the output transistor 42a with the lowest voltage difference between the input and the output voltages with which the output transistor 42a has constant current characteristic. Thus, a voltage drop of the output transistor 42a is suppressed so that power loss of the series regulator 30a is reduced, and the amount of ripple attenuation can be secured.

As recited above, in the power supply circuit 60a, the configuration in which the series regulator 30a includes the reference voltage generating circuit E41 generating the fourth voltage is illustrated. However, the invention is not limited thereto. The DC-to-DC converter 10a may include the reference voltage generating circuit E41. Also, each of the DC-to-DC converter 10a and series regulator 30a may include the reference voltage generating circuit, respectively. Furthermore, the third voltage may be externally inputted causing to omit the reference voltage generating circuit.

On the other hand, when the first voltage of the output line Vd of the DC-to-DC converter 10a is fixed, the voltage drop of the series regulator 30a, i.e., the voltage drop of the output transistor 42a is varied to follow variations of the second voltage on the output line Vo of the series regulator 30a.

As recited above, in the respect of efficiency and generation of heat, it is desirable that the first voltage of the output line Vd of the DC-to-DC converter 10a is as close as possible to the second voltage of the output line Vo of the series regulator 30a although the first voltage is needed to be higher than the second voltage.

Figure 3:
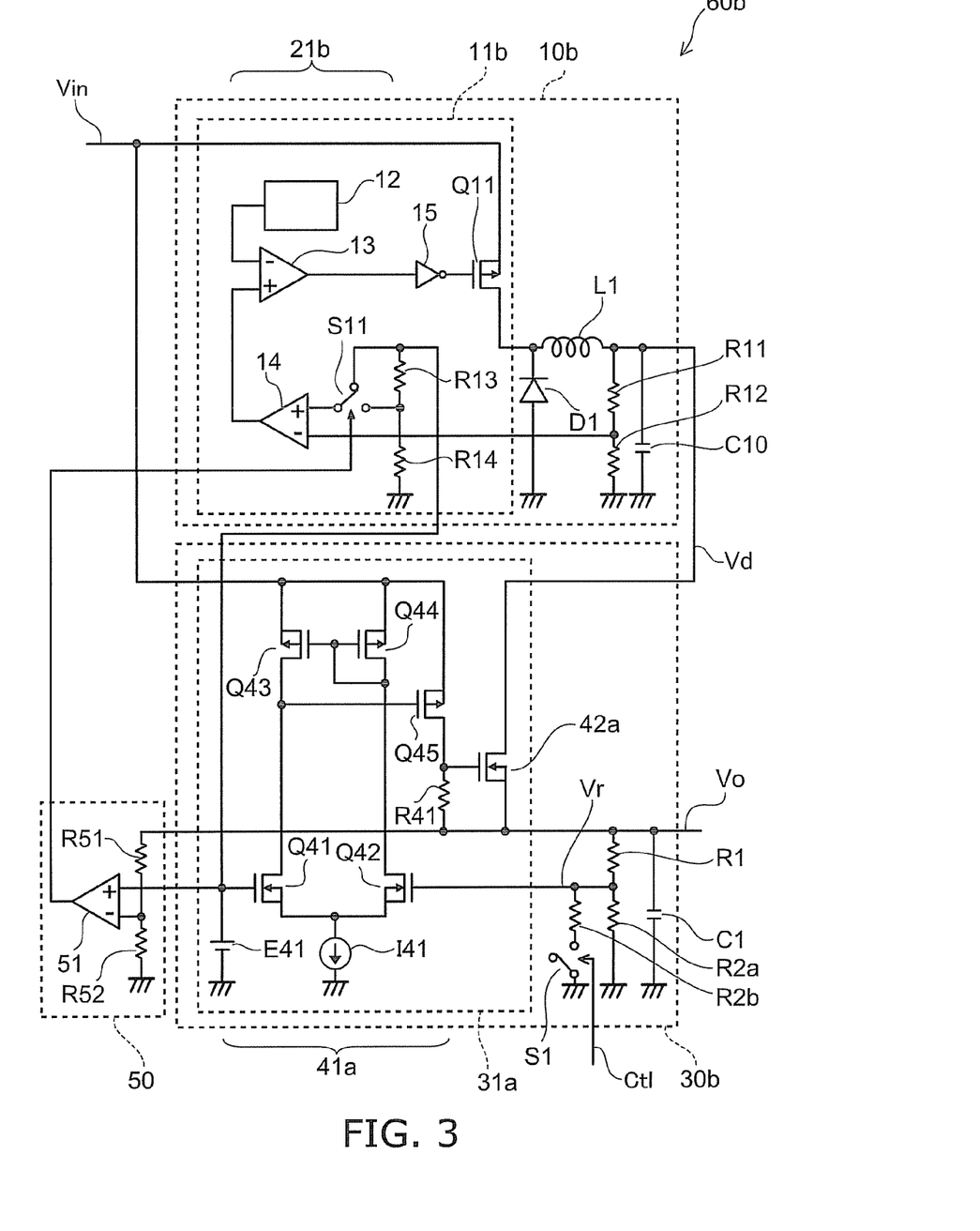
FIG. 3 is a circuit diagram illustrating another configuration of a power supply circuit according to an embodiment of the invention.

FIG. 3 is a circuit diagram illustrating another configuration of a power supply circuit according to an embodiment of the invention.

As shown in FIG. 3, a power supply circuit 60b of this embodiment includes a DC-to-DC converter 10b, a series regulator 30b, and a voltage-detecting circuit 50 detecting a second voltage.

The voltage-detecting circuit 50 includes a comparator 51 and dividing resistors R51 and R52.

In the voltage-detecting circuit 50, a voltage of the output line Vo of the series regulator 30b, i.e., the second voltage is divided by the dividing resistors R51 and R52 and inputted into a positive terminal of the comparator 51. A fourth voltage, the output voltage of the reference generating circuit E41 is inputted into a negative terminal of the comparator 51. Thus, the comparator 51 outputs a negative or a positive voltage in response to a high value or low value of the second voltage, and can detect a fluctuation of the second voltage.

The series regulator 30b is implemented by replacing the dividing resistor R2 of the series regulator 30a by the dividing resistors R2a and R2b, and switch S1.

When "0" or "1" is inputted into a control input line Ctl, the switch S1 turns on or off, and a total resistance of the dividing resistors R2a and R2b varies.

Thus, in the series regulator 30b, the voltage of the output line Vo, i.e., the second voltage can be variable. The rest is the same as the series regulator 30a. In the series regulator 30b, the configuration of the varying the second voltage by the switch S1 is illustratively used. However, the invention is not limited thereto. The resistances of the dividing resistors R1, R2a, and R2b may be varied, and the fourth voltage used as the reference voltage may be varied.

The DC-to-DC converter 10b is different from the DC-to-DC converter 10a in an input of the third voltage to the error amplifier 14 variable by the switch S11. That is, in the DC-to-DC converter 10b, the input of the third voltage to the error amplifier 14 is selected by the switch S11 from the output voltage of the reference voltage generating circuit E41, i.e., the fourth voltage, and the divided voltage of the fourth voltage divided by the dividing resistors R13 and R14.

The switch S11 is controlled by the output of the voltage-detecting circuit 50.

Thus, when "0" or "1" signal is inputted into the control input line Ctl, the second voltage of the output of the series regulator 30b varies, and the first voltage of the output of the DC-to-DC converter 10b varies in response to the variation of the second voltage.

When the second voltage of the output line Vo of the series regulator 30b is varied by the inputted signal in to the control input line Ctl, the input and output voltage difference of the series regulator 30b, i.e., the difference of the first voltage and the second voltage varies. When this input and output voltage difference becomes so low that the second voltage as the output becomes insufficient or ripples on the second voltage increases. When this input and output voltage difference becomes so high that power loss of the series regulator 30b increases, efficiency reduces, and generation of heat increases.

In the power supply circuit 60b, the first voltage of the output line Vd of the DC-to-DC converter 10b is varied in response to the result of comparing the second voltage of the output line Vo of the series regulator 30b or the divided voltage of the second voltage to the third voltage of the reference voltage. Thus, although the second voltage of the output of the series regulator 30b is varied, the input and output voltage difference of the series regulator 30b, i.e., the voltage drop of the output transistor 42a is suppressed to cover a predetermined range. Furthermore, it is possible to secure the second voltage being stable and the amount of ripple attenuation, suppressing power loss of the series regulator 30b.

In the power supply circuit 60b, the configuration of the first voltage varied due to varying the third voltage inputted into the error amplifier 14 by the switch S11 is illustratively used. However, the invention is not limited thereto. As in the series regulator 30b, the dividing ratio of the dividing resistors R11 and R12 may also be varied. That is, it may be used that the configuration of supplying the fourth voltage of the reference voltage generator E41 as the third voltage to the series regulator 30b and varying the resistance of the dividing resistor R12 by a switch.

Furthermore, in the case where the series regulator 30b is configured to vary the fourth voltage of the reference voltage generating circuit E41, the first voltage of the output of the DC-to-DC converter 10b is also varied at the same time when the second voltage of the series regulator 30b is varied.

Figure 4:
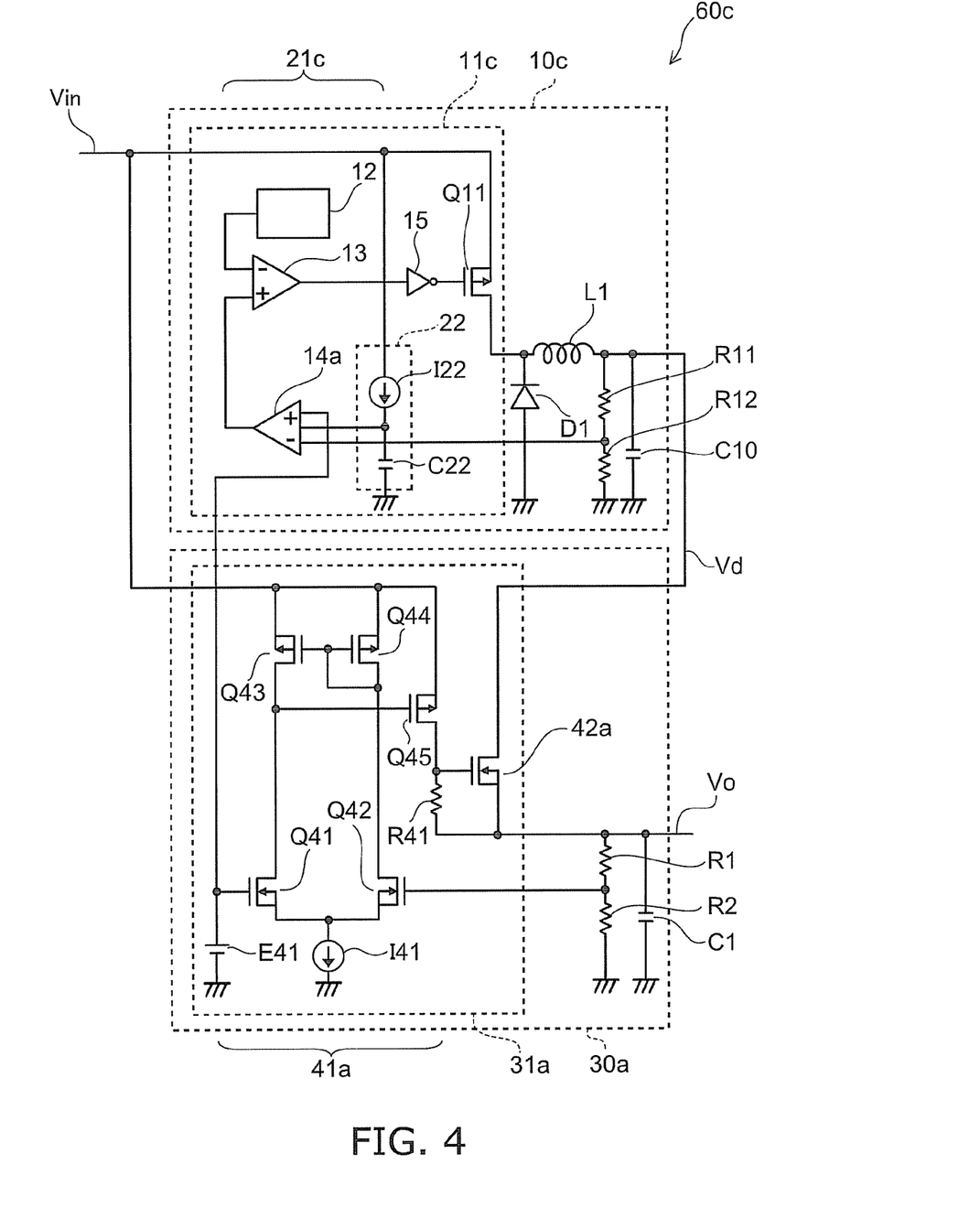
FIG. 4 is a circuit diagram illustrating another configuration of a power supply circuit according to an embodiment of the invention.

FIG. 4 is a circuit diagram illustrating another configuration of a power supply circuit according to an embodiment of the invention.

As shown in FIG. 4, a power supply circuit 60c of this embodiment is different from the power supply circuit 60a in a DC-to-DC converter 10c including a soft start circuit 22 and being implemented by replacing the error amplifier 14 by the error amplifier 14a.

The soft start circuit 22 includes a current generating circuit I22 and a capacitor C22.

The current generating circuit I22 is charged by applying a current to the capacitor C2. The voltage across the capacitor C22 is inputted into a positive terminal of an error amplifier 14a. Here, the amplifier 14a includes two positive terminals and a negative terminal. One positive terminal and the negative terminal receive the third voltage and the first voltage respectively, and these are the same as the error amplifier 14.

The error amplifier 14a amplifies an error between the minimum of the third voltage and a voltage across the capacitor C22 inputted into each of the two positive terminals and a divided voltage of the first voltage inputted into the negative terminal.

When the input supply voltage is applied from the input supply line Vin, the voltage across the capacitor C22 increases from zero to the input supply voltage due to the current generated by the current generating circuit I22. Thus, when the voltage across the capacitor C22 is lower than the third voltage, the first voltage of the output of the DC-to-DC converter 10c is controlled with the voltage across the capacitor C22 as a reference. The first voltage increases from zero to a steady-state value determined by the voltage across the capacitor C22 and becomes a constant voltage. Hence, the first voltage increases together with the voltage across the capacitor C22.

An increasing rate of the first voltage is determined by the current generated by the current generating circuit I22 and the capacitance of the capacitor C22. When the voltage across the capacitor C22 is equal to the third voltage at a first time, the first voltage of the output of the DC-to-DC converter 10c becomes a constant voltage determined by the third voltage.

The output line Vd of the DC-to-DC converter 10c is connected to the output transistor 42a of the series regulator 30a. The second voltage of the output of the series regulator 30a operated by the first voltage of the output line Vd increases also from zero to a steady-state value determined by the third voltage in the same manner as the first voltage.

The second voltage of the output of the series regulator 30a reaches at a definite voltage in a second time. The first voltage of the output of the DC-to-DC converter 10c increases after the second time because the first voltage is higher than the second voltage. In the first time, the first voltage reaches a definite voltage, and sustains a constant voltage after that.

Thus, when the input supply voltage is applied, the first voltage and the second voltage increase from zero to steady-state values due to the soft start circuit 22.

When the first voltage and the second voltage increase, the first control circuit 41a is operated by the stable input supply voltage. Thus, the first control circuit 41a of the series regulator 30a runs stably.

That is, in the case where the first control circuit 41a is operated by the first voltage of the output of the DC-to-DC converter 10c, the operation of the first control circuit 41a may be unstable because the voltage of which the first control circuit 41a runs increases gradually when the input supply voltage is applied.

On the other hand, in the power supply circuit 60b, because the first control circuit 41a is operated by the input supply voltage of the input supply line Vin, there is no problem with the operation when the input supply voltage is applied.

Figure 5:
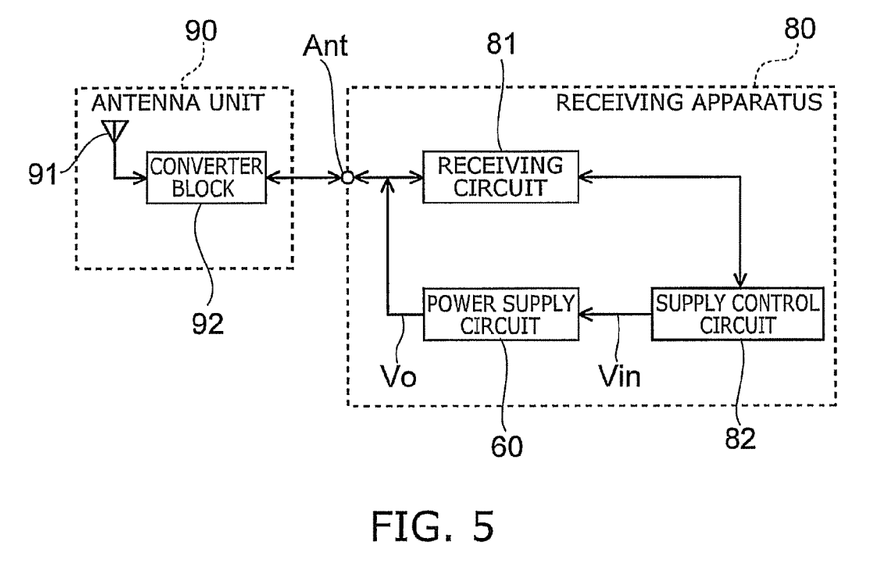
FIG. 5 is a block diagram illustrating the configuration of a receiving apparatus according to another embodiment of the invention.

FIG. 5 is a block diagram illustrating the configuration of a receiving apparatus according to an embodiment of the invention.

As shown in FIG. 5, a receiving apparatus 80 of this embodiment includes an antenna terminal Ant, a power supply circuit 60, a receiving circuit 81, and a supply control circuit 82.

The input supply line Vin of the power supply circuit 60 is connected to the supply control circuit 82, and the output line Vo of the power supply circuit 60 is connected to the antenna terminal Ant. The receiving circuit 81 receives an input signal from the antenna terminal Ant. The supply control circuit 82 also supplies the power supply to the receiving circuit 81 and controls the receiving circuit 81.

An antenna unit 90 is connected externally to the receiving apparatus 80. The antenna unit 90 includes an antenna 91 and a converter block 92.

The converter block 92 operates due to being supplied from the output line Vo of the power supply circuit 60. The converter block 92 converts received radio signals to frequencies and outputs RF signals to the receiving apparatus 80 via the antenna terminal Ant.

The RF signals received from the antenna terminal Ant is demodulated by the receiving circuit 81.

In the antenna unit 90, a low noise power supply is needed because of receiving weak radio signals. Further, a power supply circuit is required to be high efficiency because of reducing power dissipation of the receiving circuit 80.

As described above, the power supply circuit 60 is a low power dissipation and low noise and can be used to a receiving apparatus. For instance, it is used to tuners receiving signals from a broadcasting satellite and a communications satellite.

In the receiving apparatus 80, the power supply circuit 60 is illustratively used, but the other power supply circuits 60*a*-60*c* may be used. In case of the power supply circuit 60*b* being used, for instance, the control input of the power supply circuit 60*b* can be controlled by the supply control circuit 82.

The embodiments of the invention have been described with reference to examples. However, the invention is not limited to these examples. For instance, various specific configurations of the components constituting the power supply circuit and the receiving apparatus are encompassed within the scope of the invention as long as those skilled in the art can similarly practice the invention and achieve similar effects by suitably selecting such configurations from conventionally known ones.

Furthermore, any two or more components of the examples can be combined with each other as long as technically feasible, and such combinations are also encompassed within the scope of the invention as long as they fall within the spirit of the invention.

Furthermore, those skilled in the art can suitably modify and implement the power supply circuit and the receiving apparatus described above in the embodiments of the invention, and all the power supply circuits and the receiving apparatuses thus modified are also encompassed within the scope of the invention as long as they fall within the spirit of the invention.

Furthermore, those skilled in the art can conceive various modifications and variations within the spirit of the invention, and it is understood that such modifications and variations are also encompassed within the scope of the invention.

The invention claimed is:

1. A power supply circuit comprising:
   a DC-to-DC converter including: a first switching element having one end supplied with an input supply voltage and another end outputting a first voltage dropped from the input supply voltage; a diode connected between the another end of the first switching element and a ground; and a second control circuit comparing a third voltage to a divided voltage of the first voltage and controlling at least the first switching element;
   a series regulator including: an output transistor supplied with the first voltage and outputting a second voltage dropped from the first voltage; and a first control circuit operated by the input supply voltage and controlling the output transistor; and
   a voltage-detecting circuit detecting the second voltage and varying the third voltage or a dividing ratio to divide the first voltage in order to vary the first voltage.

2. The circuit according to claim 1, wherein
   the DC-to-DC converter includes a soft start circuit, and
   when the input supply voltage is applied, the first voltage increases from zero to a steady-state value during a first time period and the second voltage increases from zero to a steady-state value during a second time period.

3. The circuit according to claim 1, wherein
   the first control circuit or the second control circuit includes a reference voltage generating circuit outputting a fourth voltage, and
   the second control circuit sets the fourth voltage or a divided voltage of the fourth voltage to the third voltage.

4. A receiving apparatus comprising:
   an antenna terminal;
   a receiving circuit receiving a radio signal from the antenna terminal; and
   a power supply circuit including:
      a DC-to-DC converter including: a first switching element having one end supplied with an input supply voltage and another end outputting a first voltage dropped from the input supply voltage; a diode connected between the another end of the first switching element and a ground; and a second control circuit comparing a third voltage to a divided voltage of the first voltage and controlling at least the first switching element;
      a series regulator including: an output transistor supplied with the first voltage and outputting a second voltage dropped from the first voltage to the antenna terminal; and a first control circuit operating with the input supply voltage and controlling the output transistor; and
      a voltage-detecting circuit detecting the second voltage and varying the third voltage or a dividing ratio to divide the first voltage in order to vary the first voltage.

5. The apparatus according to claim 4, wherein
   the DC-to-DC converter includes a soft start circuit, and
   when the input supply voltage is applied, the first voltage increases from zero to a steady-state value during a first time period and the second voltage increases from zero to a steady-state value during a second time period.

6. The apparatus according to claim 4, wherein
   the first control circuit or the second control circuit further includes a reference voltage generating circuit outputting a fourth voltage, and
   the second control circuit sets the fourth voltage or a divided voltage of the fourth voltage to the third voltage.

* * * * *